United States Patent
Ouellette et al.

(10) Patent No.: US 10,399,695 B2
(45) Date of Patent: Sep. 3, 2019

(54) CHECKLIST DISPLAY SYSTEM, METHOD AND GRAPHICAL DISPLAY THEREFOR

(75) Inventors: Benoit Ouellette, Verdun (CA); Aurélien Blond, Montreal (CA); Sophie Duchesne, Verdun (CA); Nadia Routhier, Hudson (CA)

(73) Assignees: C SERIES AIRCRAFT LIMITED PARTNERSHIP, Mirabel (CA); BOMBARDIER INC., Montreal (CA)

( * ) Notice: Subject to any disclaimer, the term of this patent is extended or adjusted under 35 U.S.C. 154(b) by 0 days.

(21) Appl. No.: 14/419,800

(22) PCT Filed: Aug. 7, 2012

(86) PCT No.: PCT/IB2012/001516
§ 371 (c)(1),
(2), (4) Date: Jun. 5, 2015

(87) PCT Pub. No.: WO2014/023989
PCT Pub. Date: Feb. 13, 2014

(65) Prior Publication Data
US 2015/0298816 A1 Oct. 22, 2015

(51) Int. Cl.
*B65D 43/00* (2006.01)
*B64D 43/00* (2006.01)
(Continued)

(52) U.S. Cl.
CPC ............ *B64D 43/00* (2013.01); *B64D 45/00* (2013.01); *G08G 5/003* (2013.01); *G08G 5/0021* (2013.01); *B64D 2045/0075* (2013.01)

(58) Field of Classification Search
CPC ............ G06Q 10/06; G06Q 10/06316; G06Q 10/0639; G06Q 10/10; G06Q 40/02;
(Continued)

(56) References Cited

U.S. PATENT DOCUMENTS

| 4,970,683 A | 11/1990 | Harshaw |
| 5,454,074 A * | 9/1995 | Hartel ...................... B64G 1/22 434/50 |

(Continued)

FOREIGN PATENT DOCUMENTS

CN 101411187 A 4/2009

OTHER PUBLICATIONS

Chinese Office Action for corresponding Chinese patent application 201280075203.6 dated Sep. 6, 2015.
(Continued)

*Primary Examiner* — Kimberly S Berona
*Assistant Examiner* — Sanjeev Malhotra
(74) *Attorney, Agent, or Firm* — Norton Rose Fulbright Canada LLP (57) ABSTRACT

The present disclosure relates to a check-list display system (100), a method, a graphical interface (120) and a computer program product. The checklist display system, method, graphical interface and computer program product display in a first segment (202) of one page of the checklist display (200) at least one normal checklist identifier (210). The checklist display system, method, graphical interface and computer program further display in a second segment (206) of the one page of the checklist display at least one non-normal checklist identifier (220) and at least one limitation information (230) relating to one of the non-normal checklist.

5 Claims, 6 Drawing Sheets (51) Int. Cl.
  *B64D 45/00* (2006.01)
  *G08G 5/00* (2006.01)

(58) Field of Classification Search
  CPC .. G06Q 40/04; G07C 3/00; G07C 5/08; H02J 3/008; Y04S 10/58; Y04S 50/10; F16D 65/78; F16D 65/847
  USPC ....... 705/7.26, 37; 340/436; 717/101; 701/1, 701/4; 715/202; 434/50
  See application file for complete search history.

(56) References Cited

U.S. PATENT DOCUMENTS

| | | | |
|---|---|---|---|
| 5,522,026 | A | 5/1996 | Records |
| 6,122,575 | A | 9/2000 | Schmidt |
| 6,262,720 | B1* | 7/2001 | Jeffrey ............... G05B 23/0272 |
| | | | 715/202 |
| 6,753,891 | B1 | 6/2004 | Chohan |
| 7,191,406 | B1 | 3/2007 | Barber |
| 7,392,486 | B1 | 6/2008 | Gyde |
| 2002/0120375 | A1 | 8/2002 | Draoullec |
| 2003/0055776 | A1* | 3/2003 | Samuelson ............ G06Q 40/04 |
| | | | 705/37 |
| 2006/0020909 | A1* | 1/2006 | Pradhan ................ G06Q 10/06 |
| | | | 717/101 |
| 2006/0041340 | A1* | 2/2006 | Stefani ................ G08G 5/0095 |
| | | | 701/4 |
| 2006/0149439 | A1* | 7/2006 | Poier .................... G01C 23/005 |
| | | | 701/1 |
| 2007/0142980 | A1 | 6/2007 | Ausman |
| 2007/0150119 | A1* | 6/2007 | Mitchell ................ G06Q 10/10 |
| | | | 701/1 |
| 2008/0140266 | A1 | 6/2008 | Stefani |
| 2009/0248481 | A1* | 10/2009 | Dick ................ G06Q 10/06316 |
| | | | 705/7.26 |
| 2010/0039247 | A1* | 2/2010 | Ziegler .................. G06Q 10/06 |
| | | | 340/436 |
| 2010/0174423 | A1 | 7/2010 | Pimouguet |
| 2011/0313597 | A1 | 12/2011 | Wilson |

OTHER PUBLICATIONS

International Search Report for corresponding application PCT/IB2012/001516 filed Aug. 7, 2012; dated Mar. 14, 2013.
Written Opinion for corresponding application PCT/IB2012/001516 filed Aug. 7, 2012; dated Mar. 14, 2013.
Second Chinese Office Action for corresponding chinese patent application 201280075203.6 dated May 18, 2016.
Chinese Office Action for corresponding application 201280075203.6; Office Action dated Nov. 9, 2016.
Chinese Office Action for corresponding Chinese patent application 201280075203.6 dated Jun. 15, 2017.

\* cited by examiner

| N-N.C.I. | N.-N.C. | Item | Type of Item |
|---|---|---|---|
| 3 | Hydraulic - brakes | A | To be executed |
| | | B | Deferred |
| | | C | Limitation 3.1 |
| | | D | Limitation 3.2 |

CHECKLIST DISPLAY SYSTEM, METHOD AND GRAPHICAL DISPLAY THEREFOR

FIELD

The present relates to display of checklists in aircraft, and more particularly to a checklist display system, method graphical display and computer program therefore.

BACKGROUND

Electronic checklists have been implemented in aircraft for over a decade. Electronic checklists assist the pilot and crew in completing, in a coordinated manner, a series of steps and verifications ensuring a secure flight.

There are two types of checklists: normal checklists and non-normal checklists. Normal checklists consist of a group of checklists that must be performed for each flight. Non-normal checklists are also often referred to as warning, caution or advisory procedure checklists. Each non-normal checklist comprises one or multiple verifications and/or operations that must be performed by the pilot and crew upon issuance of a Crew Alerting System (CAS) message, displayed on a CAS display. CAS messages are triggered by measurements and events outside normal and/or acceptable thresholds or tolerances. Aircraft further include an Engine-Indicating and Crew-Alerting System (EICAS), which detects and reports by means of the CAS display alert(s) of non-normal measurement(s) or event(s) outside the acceptable thresholds or tolerances. Each non-normal checklist corresponds to one CAS message, and is executed by the pilot and/or crew, after the Crew Alerting System has received a measurement and/or event outside normal and/or acceptable thresholds or tolerances.

Each non-normal checklist provides a series of verifications and operations that must be performed by the pilot and crew, following issuance of the corresponding CAS message. The series of verifications and operations aim at reconfiguring one system and identifying any new limitation of the related system and sub-system which might affect operation of the aircraft. Examples of limitations may include: maximum speed, landing distance, maximum altitude, etc. Any new limitation identified upon execution of the non-normal checklist is then displayed on the non-normal checklist display page.

Several patents and patent applications relate to electronic checklists.

U.S. Pat. No. 7,392,486 to Honeywell International Inc. describes modifying a display to include contemporaneous information during the execution of a checklist. The displayed contemporaneous information is contextual, and is displayed on a per checklist basis, so as to assist and facilitate execution of the checklist.

U.S. Pat. No. 5,522,026 to Boeing Company describes a computer-based system for creating a single electronic checklist in response to multiple faults. Dynamic generation of a checklist is based on predefined actions on a per fault basis, sets of priority rules, and execution of a set of conflict rules.

U.S. Pat. No. 5,454,074 to Boeing Company describes an electronic checklist system interfaced with a crew alert system. Normal and non-normal checklists are displayed on a system menu screen. A Notes button 52 is provided for displaying all operational notes that have been included in the checklists which were executed during the ongoing flight.

US 2007/0142980 from Ausman et al. describes a system for sensing attributes of an aircraft, and displaying related information which comprises contextual information and contextual normal checklists and status.

US 2007/0150119 to Boeing Company describes a voice checklist system for assisting the pilot in conditions of fault detection.

US 2008/0140266 to ARINC Inc. describes a display and system which organizes the list of checklists based on chronological order, to provide fast access and in context checklists. The display and system provides functionality for pre-setting the displayed information on a per user basis.

U.S. Pat. No. 6,753,891 to Honeywell International Inc. describes a display for checklists with hyperlink capabilities.

An aircraft cockpit nowadays include several electronic displays, which allow multiple and varied configurations. However, the pilot and crew oftentimes must navigate from one display to another and from one page to another within a single display, to keep track of the current operating status of the various systems and sub-systems of the aircraft. There is therefore a need for an improved checklist display, which provides at-a-glance overview of limitations of the systems and sub-systems.

SUMMARY

In a first aspect, the present relates to a checklist display system. The checklist display system comprises a checklist display and a display manager. The display manager displays on one page of the checklist display a first segment and a second segment. The first segment of the one page displays at least one normal checklist identifier. The second segment of the one page displays at least one non-normal checklist identifier and at least one limitation information relating to the at least one non-normal checklist identifier.

In another particular aspect, the display manager displays the at least one limitation information under the relating non-normal checklist identifier.

In yet another particular aspect, the first segment further displays on the one page for each one of the at least one normal checklist identifier a relating status, and the second segment displays on the one page for each one of the at least one non-normal checklist identifier a relating status.

In another aspect, the status relating to one of the at least one normal checklist identifier and the status relating to one of the at least one non-normal checklist identifier is one of: not started, started, completed, completed with deferred and overridden.

In yet another aspect, the checklist display further comprises a graphical actuator to be moved on the checklist display by a user.

In still another aspect, the display manager further displays on the checklist display a normal checklists index page navigation actuator and a non-normal checklists systems index page navigation actuator. Furthermore, in that aspect, the graphical actuator permits a user to navigate from the one page to the normal checklists index page and the non-normal checklists systems index page by actuating respective one of the normal checklists index page navigation actuator and the non-normal checklists systems index page navigation actuator.

In still another aspect, the display manager comprises a graphical interface, a graphical card and an input unit for receiving the at least one normal checklist identifier, the at least one non-normal checklist identifier, and the at least one limitation information.

In yet another aspect, the at least one normal checklist identifier is aircraft flight phase dependent.

In another aspect, the present relates to a graphical display comprising first and second graphical segments displayed on one page. The first graphical segment displays on the one page at least one normal checklist identifier. The second graphical segment displays on the one page at least one non-normal checklist identifier. The second graphical segment further displays on the one page at least one limitation information relating to one of the at least one non-normal checklist identifier.

In yet another aspect, the first graphical segment further displays on the one page for each of the at least one normal checklist identifier a relating status, and the second graphical segment further displays on the one page for each one of the at least one non-normal checklist identifier a relating status.

In another aspect, the status relating to each one of the at least one normal checklist identifier and the status relating to each one of the at least one non-normal checklist identifier is one of: not started, started, completed, completed with deferred and overridden.

In yet another aspect, the one page is a summary page.

In still another aspect, the graphical display further comprises a normal checklists index page actuator for navigating to a normal checklists index page, and a non-normal checklists systems index page actuator for navigating to a non-normal checklists systems index page; and the graphical actuator allows a user to navigate to the normal checklists index page upon actuation of the normal checklists index page actuator and to the non-normal checklists systems index page upon actuation of the non-normal checklists systems index page actuator by means of the graphical actuator.

In yet another particular aspect, the graphical display further comprises a graphical interface, a graphical card and an input unit for receiving the at least one normal checklist identifier, the at least one non-normal checklist identifier, and the at least one limitation information.

In another particular aspect, the present disclosure relates to a method for displaying checklist information on an aircraft checklist display. The method comprises displaying in a first graphical segment on one page of the aircraft checklist display at least one normal checklist identifier. The method further comprises displaying in a second graphical segment on the one page of the aircraft checklist display at least one non-normal checklist identifier. The method also comprises displaying in the second graphical segment on the one page of the aircraft checklist display at least one limitation information relating to one of the at least one non-normal checklist identifier.

In yet another aspect, the present method further comprises displaying in the first graphical segment on the one page of the aircraft checklist display for each of the at least one normal checklist identifier a relating status, and displaying in the second graphical segment on the one page of the aircraft checklist display for each of the at least one non-normal checklist identifier a relating status.

In still another aspect of the method, the status relating to the at least one normal checklist identifier and the status relating to the at least one non-normal checklist identifier is one of: not started, started, completed, completed with deferred and overridden.

In yet another aspect, the method further comprises displaying a movable graphical actuator on the aircraft checklist display.

In still another aspect of the method, the one page is a summary page of the aircraft checklist display.

In yet another aspect, the method further comprises displaying a normal checklists index page actuator for navigating to a normal checklists index page, a non-normal checklist systems index page actuator for navigating to a non-normal checklists systems index page, while the graphical actuator allows a user to navigate to the normal checklists index page upon actuation of the normal checklists index page actuator and to the non-normal checklists systems index page upon actuation of the non-normal checklists systems index page actuator.

In another aspect, the present invention relates to a computer program product comprising a computer readable memory storing computer executable instructions thereon that when executed by a processing system perform the present method steps.

BRIEF DESCRIPTION OF THE DRAWINGS

In the following description, the following drawings are used to describe and exemplify the present checklist display system, method and graphical interface.

DETAILED DESCRIPTION

The present invention relates to a checklist display system, a method for displaying checklist information, and a graphical display on which checklist information is displayed.

Avionic System Overview

Figure 1:
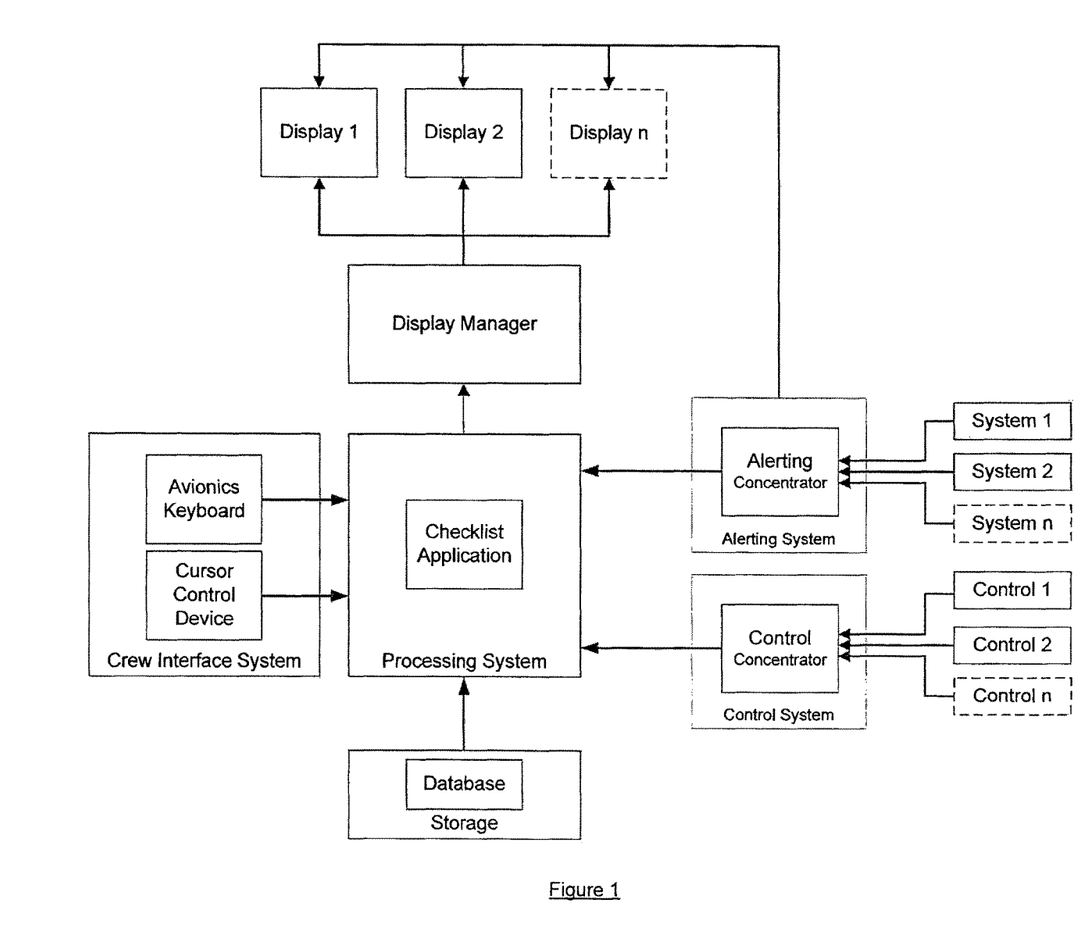
FIG. 1 is a high level diagram of an exemplary avionic system.

To better understand the context of the present invention, a brief overview of an avionic system will be provided with reference to FIG. 1, which is a high level diagram of an exemplary avionic system. FIG. 1 depicts only components of the avionic system which relate directly or indirectly to checklists, and is thus not a complete representation of an avionic system. Avionic systems and related terminology vary from one manufacturer to another and from one aircraft manufacturer to another. Therefore, the following description of the avionic system of FIG. 1 should be construed only as an introduction and as a means for placing into context the present invention, but not for limiting the application and/or scope of the present invention.

Aircraft include multiple components to assist the pilot and crew in flying the aircraft, and processing and displaying checklists. These components accomplish dedicated functions, and are interconnected in such a manner as to ensure safe and managed interrelations. The functions and components may be divided in six categories: alerting system, control system, crew interface system, display system, storage system and processing system.

Alerting System

Aircraft comprise large numbers of systems. These systems include: engines, landing gears, electric systems, hydraulic systems, pneumatic systems, de-icing systems, pressurization systems, air conditioning systems, water systems, passenger display systems, etc. Each of those systems sends signals to an alerting concentrator when predetermined conditions are reached or exceeded. The signals sent by the systems 1-n may include for example measurements, variations, warnings, status, etc. The alerting concentrator receives the signals from the various systems, formats them into a format appropriate for receipt by a processing system and the display system. The alerting concentrator further validates CAS messages and CAS messages' logical operation (for example: TRUE/FALSE) to be relayed to one of the display, typically dedicated to display CAS messages as appropriate.

Control System

Changes in cockpit controls, such as in an overhead zone, pedestal, and virtual commands referred as Control 1-n in FIG. 1, are relayed to the processing system through a control concentrator. The control concentrator relays signals from multiple systems through one or many data path to the avionics system.

Crew Interface System

The pilot and crew, also referred herein as the users, may use a keyboard, trackball respectively identified as avionics keyboard and cursor control device on FIG. 1, to set views, navigate on the displays, etc. For doing so, the keyboard and cursor control device send signals to the processing system, which in turn, changes the displays and/or the cursor location on the corresponding display as requested by the users.

The keyboard and cursor control device further send commands to the processing system to control an electronic checklist application.

The pilot and crew may further use touchscreen displays in replacement of or in conjunction with the traditional keyboard and trackball although not specifically shown on FIG. 1, but being part of the crew interface system.

Display System

Aircraft cockpits nowadays typically comprise multiple displays including for example, display units, touchscreen display units and Electronic Flight Bags. Some displays may have fixed configurations, while others may have user definable configurations. The information shown on each of the display is received from the processing system through the display manager, and/or directly from the alerting concentrator for the display responsible of displaying Crew Alerting System (CAS) messages.

Typically, one of the displays or displays partition is used to display CAS messages, while another is used to display checklists related information. The other display(s) may be used to display synoptic information, contextual information, primary flight information, etc.

Storage System

A storage system stores permanent and volatile digital data. For doing so, the storage system may include one or several types of electronic memory, such as for example Read Only Memory and Random Access Memory. The digital data may be stored directly in memory or in database (s) stored in memory. For example, asserted CAS messages, normal checklists status, normal checklists items' status, non-normal checklists status, non-normal checklists items' status are usually stored in volatile memory, while CAS logic equations, normal checklists and related normal checklists identifiers and items, non-normal checklists and their related non-normal checklists identifiers, items and related limitation information are usually stored in one or several databases in memory. The storage system may further store active faults and crew selection(s).

The processing system retrieves from the storage system the relevant checklist information, including active faults and status for display on selected cockpit displays, through a display manager.

Processing System

The processing system is the "brain" of the avionic system. It receives messages from the crew input system, alerts from the alerting system and control messages from the control system. The processing system further communicates with the display system, through the display manager. The processing system further extracts required and/or relevant information from the storage system.

The processing system may include one or several processors, one or several Field Programmable Gate Array (FPGA), Random-Access Memory and/or Read-Only Memory, and any necessary software, such as a checklist application, to perform its assigned tasks.

From the received messages and alerts, the processing system updates the storage system and determines by means of the checklist application and the stored information in the storage system, the checklist information to be displayed on the checklist display. The processing system interfaces with the display manager, to display the relevant checklist information on one or several displays, as predefined and applicable.

Electronic Checklists

Figure 5:
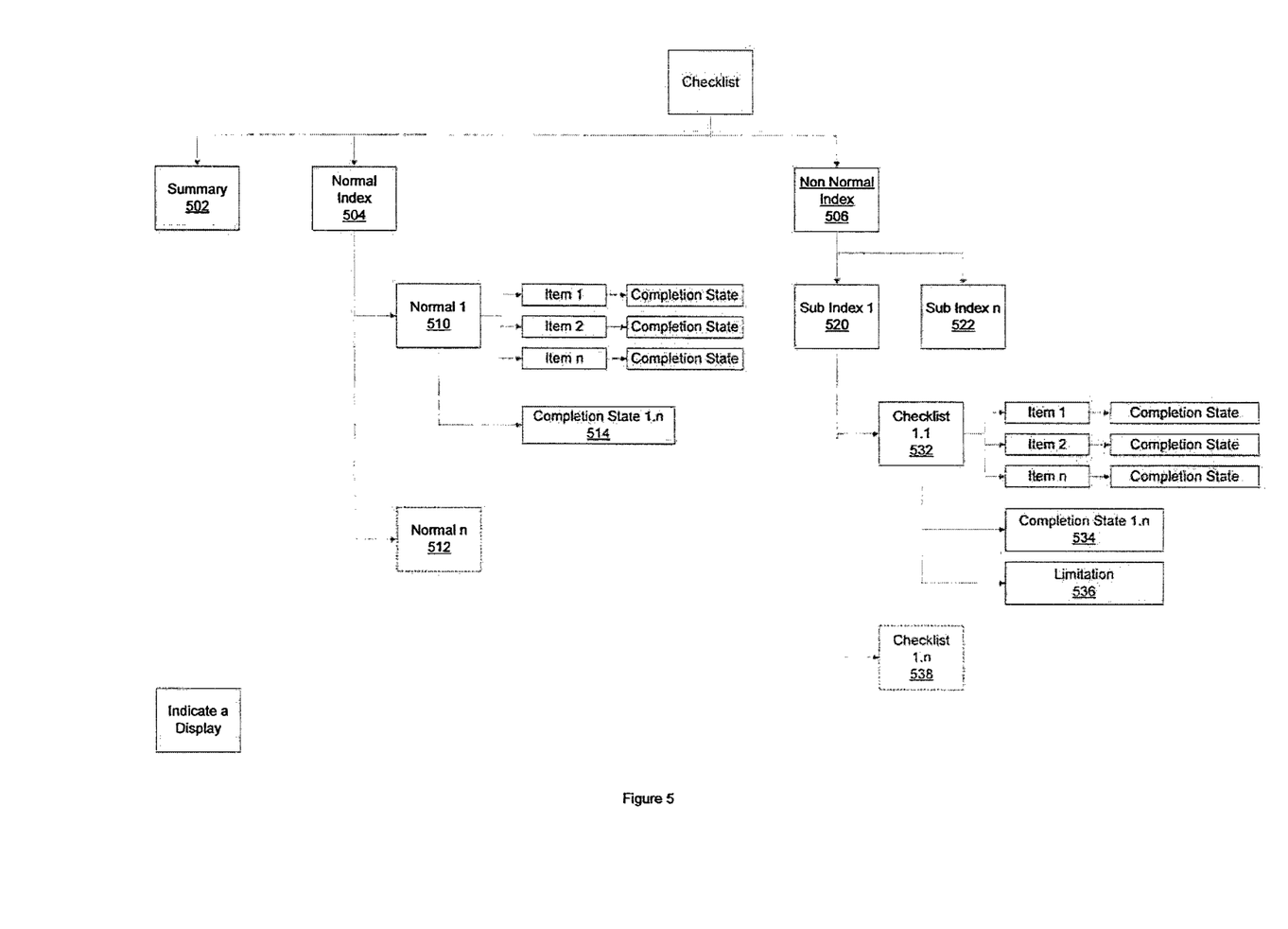
FIG. 5 is a functional representation of a checklist application.

Electronic checklists are displayed on a display or display partition dedicated, either permanently or punctually, usually identified as a checklist display. Reference is made to FIG. 5, which is a functional representation of a checklist application. The electronic normal checklists are listed on a normal checklists index page 504, while the electronic non-normal checklists are listed on a non-normal checklists index page 506. Electronic non-normal checklists are usually grouped on the non-normal checklist index page 506 by type of system, such as for example: electric, pneumatic, hydraulic, air-conditioning, etc.

The normal checklist index page 504 provides an index of normal checklist identifiers 510 and a status 514 for each of the corresponding normal checklist. Upon selection of one of the normal checklist identifiers 510, a corresponding normal checklist, listing items, verifications and/or operations that must be performed by the users for executing the normal checklist, are displayed with a status for each item.

The non-normal checklist display systems index page 506 provides a list of types of systems. Upon selection of one of the types of systems 520-522 by actuation of a corresponding actuator by the users, related non-normal checklists identifiers 532 and the related status 536 relating to each corresponding non-normal checklist identifier 532 are displayed. Upon selection of one of the non-normal checklist identifiers 532 by the pilot or a crew member, a non-normal checklist corresponding to the selected non-normal checklist identifier is displayed. The displayed non-normal checklist includes a list of items (i.e. verifications and/or operations) that must be performed by the pilot or crew to complete the non-normal checklist. The displayed non-normal checklist further includes a status for each item of the non-normal checklist, the status indicating a completion state of the non-normal checklist items.

In addition to the normal checklists index page 504 and the non-normal checklists systems index page 506, the checklist display 200 and the display manager 110 further display a summary page 502. The summary page 502 provides an overview of the normal checklists identifiers of normal checklists to be executed during the current phase of the flight, along with a relating status of each normal checklist. Furthermore, the summary page also displays a list of non-normal checklists identifiers corresponding to non-normal checklists to be completed or already executed, along with a relating status.

Although FIG. 5 only depicts two normal checklist identifiers 510 and 512, only two non-normal checklists systems 520 and 522, and only two non-normal checklists identifiers 532 and 538, the present invention is not limited to such a number of normal checklist identifiers, non-normal checklists identifiers and non-normal checklists systems. Those skilled in the art are familiar with the extensive number of normal checklists, non-normal checklists, non-normal checklists systems and items, and will understand that FIG. 5 is a greatly simplified representation of a checklist application, which is provided only to explain aspects of the checklists displayed by the present invention.

Checklist Display System

Figure 2:
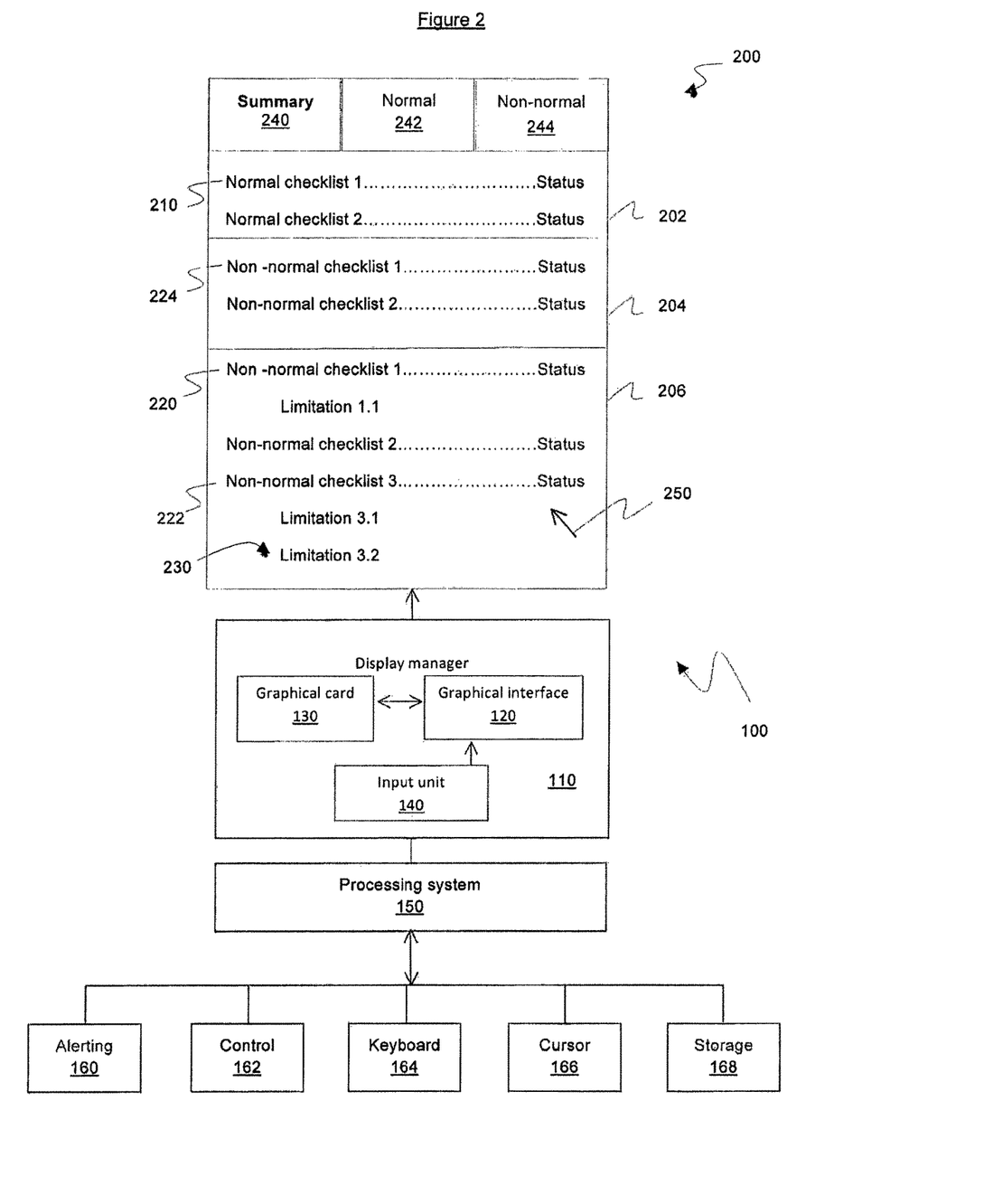
FIG. 2 is a diagram of a checklist display system and graphical display in accordance with the present invention.

Reference is now made to FIG. 2, which is a diagram of a checklist display system 100 and graphical display 200, also referred as a checklist display, in accordance with the present invention. The checklist display system 100 includes a graphical display such as the checklist display 200 and a display manager 110.

As previously described in the overview of the avionic system of FIG. 1, the display manager 110 interfaces and communicates with the processing system 150. The processing system 150 receives alerts from the alerting function and related components 160. The processing system 150 further receives control messages from the control function and related components 162. The processing system 150 also receives commands from the crew interface system by means of the keyboard 164 and cursor control device 166. The processing system further extracts checklist related information and required digital data from the storage system 168.

The checklist display system 100 and the checklist display 200 are configured in such a manner as to provide on one page: normal checklist information, non-normal checklist information and related limitation information, such as for example on a summary page. The checklist display further includes navigation functionality allowing the pilot and crew to navigate from the summary page, to the normal checklist display page, the non-normal checklist display page, and vice-versa.

Reference is now concurrently made to FIGS. 2 and 5. The checklist display system 100 and the checklist display 200 provide navigation capability between the summary page 502 (shown on FIG. 2), a normal checklist index page 504 and a non-normal checklist systems index page 506, by selecting and actuating a summary navigation actuator 240, a normal checklists page navigation actuator 242 or a non-normal checklists page navigation actuator 244.

Actuating the normal checklists index page navigation actuator 242 results in displaying on the checklist display 200 the normal checklists index page 504. The normal checklists index page 504 displays normal checklists identifiers 210 corresponding to the normal checklists, along with related status 514 (also referred as completion state). From the normal checklists index page 504, the pilot and crew may select one of the normal checklist identifiers, for example the normal checklist 510. Selecting the normal checklist identifier 510 results in displaying items 1-n relating to the normal checklist 510, along with a status (shown as a completion state) for each item. Items 1-n may include verification(s) and operation(s) to be executed by the pilot and crew.

Actuating the non-normal checklists systems index navigation actuator 244 results in displaying a non-normal index of systems page 506. Non-normal checklist identifiers are grouped per systems, so as to facilitate their location and identification. For example, the non-normal checklist identifiers may be grouped in the following systems: electric, pneumatic, hydraulic, air-conditioning, de-icing, etc. From the non-normal systems index page 506, the pilot and crew may select one of the non-normal systems index page, for example the non-normal systems index page 520 or 522. Selecting one of the non-normal systems index page results in displaying the relating non-normal checklists index page, such as for example pages 532 or 538, along with relating status 534. The pilot and crew may then select one of the non-normal checklist identifiers, such as non-normal checklist identifier 532, so as to display the related items 1-n to be executed, along with the status or completion state of each item. Executing the various items by the pilot and crew results in reconfiguring one of the system, and upon completion of the items 1-n, identifying the limitation(s) 536.

Actuation of the summary page actuator 240, the normal checklists navigation actuator 242 and the non-normal checklists navigation actuator 244 may be performed by means of a cursor, shown in the checklist display 200 as an arrow 250, controlled by the cursor control device 166. The cursor could alternately be commanded by a touch screen or any other known method of electronic navigation on a display. The navigation actuators 240, 242 and 244 could be named, positioned and displayed differently on the checklist display 200. The navigation actuators 240, 242 and 244 are displayed on each page displayed on the checklist display 200, whether it is the summary page 502, the normal checklists index page 504, a normal checklist page 510, a non-normal checklists index systems page 506, a non-normal checklists index page 520 or 522 or a non-normal checklist page 532 and 538. To confirm which page is currently displayed on the checklist display 200, the corresponding navigation actuator 240, 242 or 244 may be highlighted, underlined, put in bold, etc. On FIG. 2, the checklist display 200 is displaying the summary page, and for that reason the summary navigation page actuator labelled 'Summary' is bold font.

The summary page 502 displayed on the checklist display 200 further includes segments 202, 204 and 206. The segments 202, 204 and 206 refer to areas or zones on the checklist display 200, whether partitioned or not. The segments 202, 204 and 206 respectively display checklist identifiers, and a status of a related checklist. Each checklist identifier corresponds to a checklist. To each checklist is associated a status. Thus the status displayed in the segments 202, 204 and 206 relates to the checklist identifier besides which it is displayed. Although the checklist identifier and associated status are displayed on one line on the display 200, the present invention is not limited to such a layout.

The first segment 202 of the checklist display 200 displays normal checklist identifiers 210. The normal checklist identifiers may be grouped by phase of flight, such as for example: on the ground, take-off, cruising, descent, landing, and taxiing. The phases of a flight may be defined or grouped differently, depending on the manufacturer of an avionic system or the aircraft manufacturer. The third segment 204 displays non-normal checklist identifiers and relating status of non-normal checklists to be executed. The second segment 206 provides a comprehensive history of completed non-normal checklists with relating status and relating limitation information.

The display manager 110 thus displays on the checklist display 200 at least one normal checklist identifier 210 in the first segment 202 of the checklist display 200, at least one non-normal checklist identifier 220 in the second segment 206 of the checklist display, and at least one limitation information 230 relating to one of the at least one non-normal checklist. The limitation information 230 may be displayed in various ways in the second segment 206, such as for example: under the relating non-normal checklist identifier 222, next to the non-normal checklist identifier, etc.

The summary page 502 of the checklist display 200 thus provides to the pilot and the crew members an overview of currently active normal checklist identifiers and relating status by displaying the currently active normal checklist identifiers and relating status in the first segment 202. Based on the measurements of various sensors, a determination is electronically made as to a current phase of a flight, and corresponding normal checklist identifiers 210 are then displayed on the checklist display 200 to facilitate selection. Thus in the present checklist display system 100, the normal checklist identifiers displayed on the checklist display 200 relate to normal checklists which must be performed within specific flight phase, and the normal checklists are thus flight phase dependent.

The summary page 502 of the checklist display 200 further provides the pilot and the crew members an overview of non-normal checklist identifiers to be completed (in the third segment 204) and completed (in the second segment 206), by displaying non-normal checklist identifiers, with the relating status in the second and third segments 206 and 204 of the display.

As can be appreciated to those skilled in the art, the summary page 502 of the checklist display 200 does not display the normal checklist(s) or the non-normal checklist(s) per se, but rather identifiers which refer to the normal checklist(s) and non-normal checklist(s). The status displayed by the display manager may be any of the following: not started, started, completed, completed with deferred and overridden. The status completed with deferred is used when the items of a non-normal checklist cannot be all completed at once, and must be completed at a later time.

Figure 6:
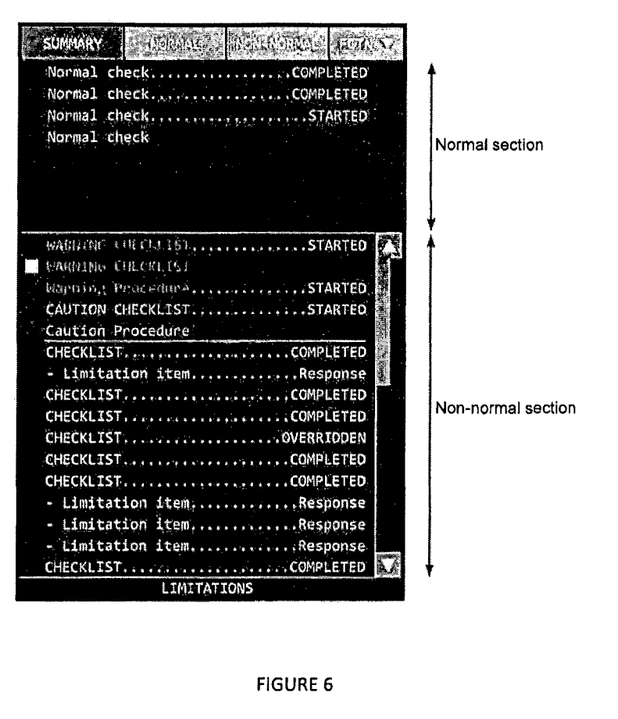
FIG. 6 is an exemplary checklist display screenshot.

Reference is now concurrently made to FIG. 6, which is an exemplary checklist display screenshot in accordance with an aspect of the present invention. Non-normal checklist identifiers to be displayed by the checklist display system 100, on the checklist display 200, are triggered by starting their execution by the pilot or a crew member. Upon starting one of the non-normal checklists, the corresponding non-normal checklist identifier 224 is displayed in the third segment 204 of the checklist display 200. Various levels of urgency may be associated to the non-normal checklist identifier 224 of non-normal checklist to be completed, by using colors for the font of the non-normal checklist identifier displayed: for, example, red for a warning non-normal checklist identifier, yellow for a caution non-normal checklist identifier, and white for completed non-normal checklist identifier. As each non-normal checklist corresponds to one CAS message, the storage system is updated with status information for that non-normal checklist.

During execution of a non-normal checklist, verifications and operation(s) are performed on corresponding system(s), sub-system(s) and/or component(s). Such verifications and operations assist and ultimately result in identifying limitation(s) of the system(s), sub-system(s) and/or component(s). The term 'limitation' refers to an impact of the result(s) of the verification(s) and operation(s) that is/are different from expected result(s) for the system(s), sub-system(s) and/or component(s), and causes loss of functionalities. Thus the limitation information 230 displayed in the second segment 206 of the summary page 502 of the checklist display 200 is not the results of the verification(s) and operation(s), but rather a calculated impact of such result(s).

When a limitation of the aircraft has been identified and/or confirmed upon completion of a non-normal checklist, the relating limitation information is displayed in the second segment 206 of the summary page on the checklist display 200, under its relating non-normal checklist identifier 220. For example, as shown on FIG. 2, the limitation information 'Limitation 3.1' has been identified upon execution of the non-normal checklist 3 which is completed. Thus in addition to providing a summary page displaying the normal checklists identifiers 210 of the normal checklists to be executed during a current flight phase, the present checklist display system 100 and checklist display 200, display started and completed non-normal checklists identifiers 224 and 220 and aircraft limitation information 230 identified and/or validated after completion of the non-normal checklist(s). By providing on the summary page of the checklist display 200 the aircraft limitation information 230 identified during execution of the non-normal checklists and relating the limitation information 230 to the non-normal checklist identifier 222, the pilot and crew members have at their disposal a contextual overview of the aircraft limitation information. The present checklist display system 100 and checklist display 200 thus consolidate the aircraft limitation information for the crew by associating the limitation information 230 to the non-normal checklist identifier 222 of the non-normal checklist during which execution the limitation information was identified, while summarizing the normal checklist(s) and non-normal checklist(s) and their status. Instead of having to consult multiple displays to mentally consolidate the aircraft limitation information and the normal and non-normal checklist status information, such information is displayed directly on the summary page 502 of the checklist display 200, for easy consulting and human error prevention.

Figure 3:
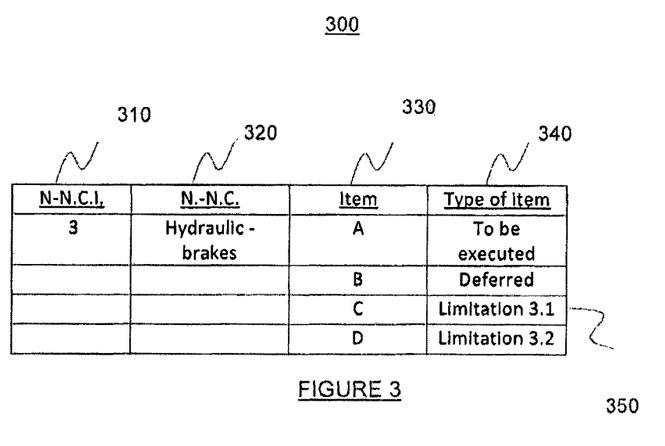
FIG. 3 is an exemplary table of a database in accordance with the present invention.

Reference is now concurrently made to FIG. 3, which is an exemplary simplified table 300 of a database in accordance with the present invention. The simplified table 300 depicts information relative to one non-normal checklist. The table comprises a first column 310 for storing the non-normal checklist identifier 224 to be displayed in the third segment 204 when the non-normal checklist is not yet completed, or the second segment 206 of the checklist display 200 when execution of the non-normal checklist has been completed. In a second column 320 of the table 300, identification of a non-normal checklist corresponding to the non-normal checklist identifier is stored. In the exemplary illustration of FIG. 3, the non-normal checklist relates to hydraulic systems, and more particularly to the brakes of the aircraft. In a third column 330, the table 300 stores one or a plurality of items (verification(s) and/or operation(s)) that must be performed by the pilot and/or crew to reconfigure the hydraulic system for brakes, and complete the non-normal checklist. There are various types of verifications and operations that may be performed in the context of execution of a checklist, and to that effect, the fourth column 340 stores a type for the item stored in column 330. For example, although items must be performed in a consecutive order, some items are performed by the pilot and crew, while others are performed by the avionic system following a verification or operation executed by the pilot and crew; some items may be deferred until a later phase of the flight, etc. The table 300 may further include limitation information relating to the non-normal checklist 320 that can be displayed on the checklist display after completion of the non-normal checklist, when a limitation has been identified. In other embodiments, the limitation information is not stored in a database but rather calculated based on results of verifications and operations.

The processing system 150 extracts from a volatile memory of the storage system 168, the status of the normal checklist(s) and the status of the non-normal checklist(s), and commands the display manager 110 to display the status adjacent to the relating normal and non-normal checklist identifiers 224, 222 and 220.

Those skilled in the art will understand that the checklist identifiers 210 and 220, status information and limitation information 230 displayed on the checklist display 200 are shown for exemplary purposes only, to facilitate understanding of the present invention.

Returning to FIG. 2, the display manager 110 will now be described in greater details. The display manager 110 includes a graphical interface 120, a graphical card 130 and an input unit 140. The input unit 140 receives the at least one normal checklist identifier 210, the at least one non-normal checklist identifier 220, and the at least one limitation information 230. The input unit 140 further receives the status relating to each normal checklist identifier and the status relating to each non-normal checklist identifier. The input unit may further receive from the processing system 150 indication as to the segment 202, 204 or 206 in which, the normal checklist identifier and relating status, the non-normal checklist identifier and relating status should be displayed.

The graphical interface 120 handles the received at least one normal checklist identifier, the at least one non-normal checklist identifier, the at least one limitation information, and the relating status and segment information, so as to provide electrical messages to the graphical card 130. The graphical card 130 is connected to the checklist display 200 so as to display the at least one normal checklist identifier, at least one non-normal checklist identifier, the at least one limitation information and their relating status on the display 200 in their corresponding segments on the summary page 502.

Graphical interfaces and graphical cards are well known in the art, and any graphical interface and graphical card, capable of displaying graphical information on the display 200 could be used.

Method

Figure 4:
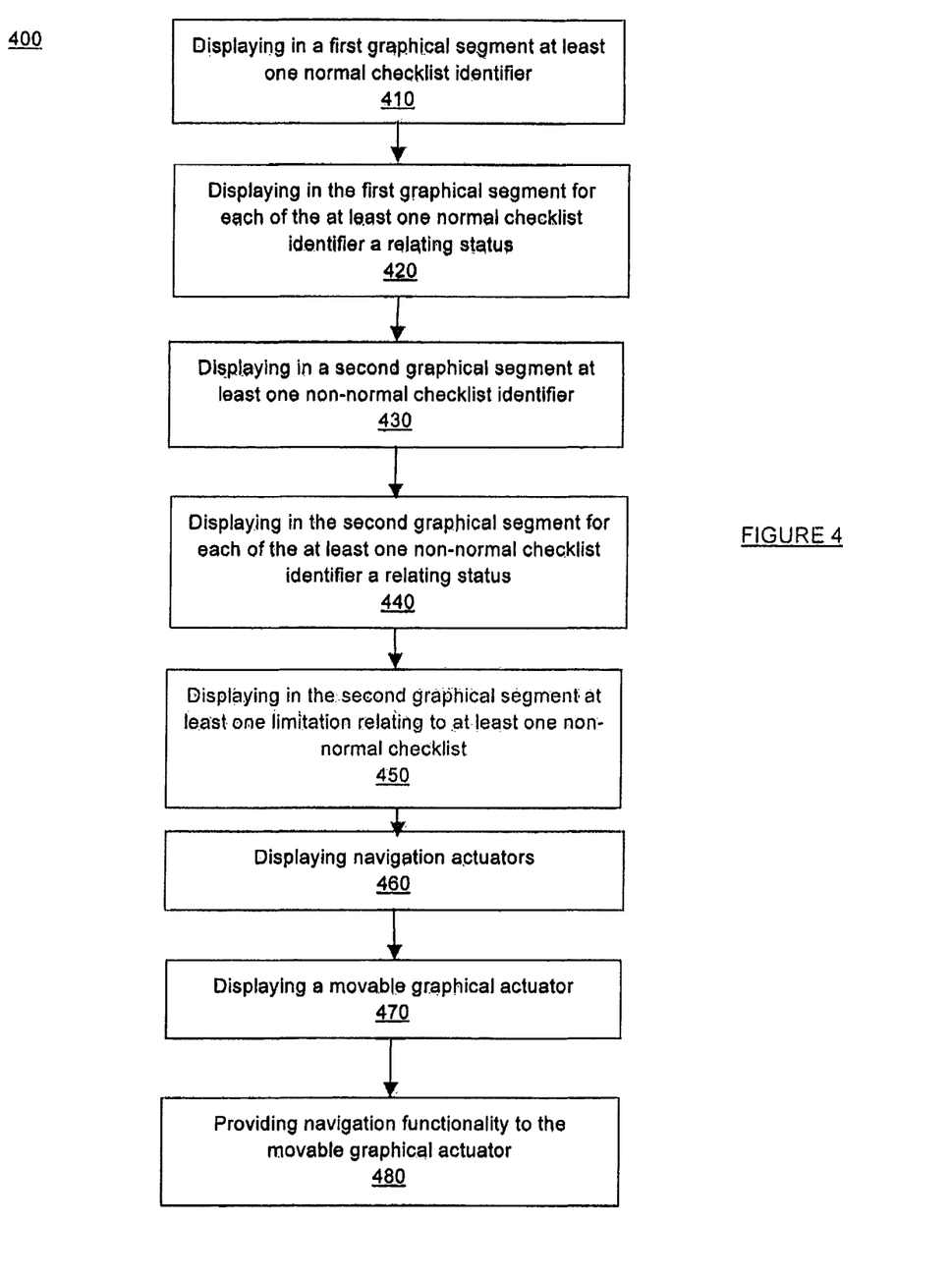
FIG. 4 is an exemplary flowchart of a method for displaying checklist information in accordance with the present invention.

Reference is now concurrently made to FIGS. 1-5, where FIG. 4 is an exemplary flowchart of a method 400 for displaying checklist information on the aircraft checklist display 200 in accordance with the present invention. The method starts with displaying in the first graphical segment 202 of the aircraft checklist display 200 at least one normal checklist identifier 210, at step 410. The method pursues with further displaying in the first graphical segment 202 a relating status for the at least one normal checklist identifier 210 at step 420. The method continues by displaying in the second graphical segment 206 of the aircraft checklist display 200 at least one non-normal checklist identifier 220 at step 430. The method also displays in the second graphical segment 206 the relating status for the at least one non-normal checklist identifier 220, at step 440. The method then proceeds with further displaying in the second graphical segment 206 at least one limitation information 230 relating to the non-normal checklist identifier 222 during which execution the limitation information 230 was identified, at step 450. As previously discussed, the at least one normal checklist identifier 210, the at least one non-normal checklist identifier 222 and the at least one corresponding limitation information 230 are displayed on a summary page of the checklist display 200.

The method pursues with displaying, the summary page navigation actuator 240, the normal checklists index page navigation actuator 242 and the non-normal checklists systems index page navigation actuator 244 at step 460. Upon selection of the normal checklists index page navigation actuator 242 by the pilot and/or crew the processing system 150 commands the display manager 110 to display the normal checklists index page 504. Upon selection of the non-normal checklists systems index page navigation actuator by the pilot and/or crew, the processing system 150 commands the display manager 110 to display the non-normal checklists systems index page 506.

The method further displays the movable graphical actuator 250 at step 470, providing to the crew navigation functionality for the graphical actuator allowing the crew to navigate from the first and second segments 202 and 206 shown on the 'Summary' page of the display, to other pages by selecting the navigation actuators, at step 480.

Although the present method has been described as a series of steps, the present series of steps should not be construed to be performed in a consecutive manner. The present steps can be rearranged, reorganized, some steps executed consecutively or in parallel, without departing from the scope of the present invention.

Although the present checklist display system, graphical display and method only describe the 'Summary' page, and introduce the navigation actuators 240, 242 and 244, the present checklist display system, graphical display and method are not limited to displaying the discussed pages. Other pages and corresponding navigation actuators maybe added without departing from the scope of the present invention.

Alternatively, the present method may be stored as computer executable instructions, stored on a computer readable memory, to be executed by the processing system 150 to perform the steps of the present method.

The present checklist display system, graphical display and method have been described by way of preferred embodiments. It should be clear to those skilled in the art that the described preferred embodiments are for exemplary purposes only, and should not be interpreted to limit the scope of the present invention. The checklist display system, graphical display and method as described in the description of preferred embodiments can be modified without departing from the scope of the appended claims, which clearly delimit the protection sought.

The invention claimed is:

1. A checklist display system for an aircraft comprising:
   a checklist display configured to be disposed within visual proximity of an operator of the aircraft; and
   a display manager for simultaneously displaying on one page of the checklist display:
     a first segment of the one page displaying at least one normal checklist identifier; and
     a second segment of the one page displaying at least one non-normal checklist identifier and at least one aircraft limitation information relating to the at least one non-normal checklist identifier;
   wherein the normal checklist identifier designates a normal procedure which is to be routinely completed during operation of the aircraft;

wherein the non-normal checklist identifier designates a non-normal procedure which is to be completed upon receipt of an alert message, and the non-normal checklist identifier is displayed in the second segment of the one page following the receipt of the alert message; and wherein the at least one aircraft limitation information is determined by completion of the non-normal procedure and comprises an indication of a limitation to an aircraft function;

wherein the checklist display system is configured to provide a contextual aircraft overview to the operator of the aircraft in real time during flight via the at least one aircraft limitation information and normal and the non-normal checklists identifiers;

wherein the first segment further displays on the one page for each one of the at least one normal checklist identifier a relating status, and the second segment further displays on the one page for each one of the at least one non-normal checklist identifier a relating status;

wherein the status relating to one of the at least one normal checklist identifier and the status relating to one of the at least one non-normal checklist identifier is one of started, completed, completed with deferred and overridden;

the system further comprising a graphical actuator movable on the checklist display by a user, wherein:

the display manager further displays on the checklist display a normal checklists index page navigation actuator and a non-normal checklists systems index page navigation actuator; and the graphical actuator permits a user to navigate from the one page to a normal checklists index page and a non-normal checklists systems index page by actuating respective one of the normal checklists index page navigation actuator and the non-normal checklists systems index page navigation actuator.

2. The checklist display system of claim 1, wherein the at least one limitation information is displayed under the relating non-normal checklist identifier.

3. The checklist display system of claim 1, wherein the display manager comprises a graphical interface, a graphical card and an input unit, the input unit receiving the at least one normal checklist identifier, the at least one non-normal checklist identifier, and the at least one limitation information.

4. The checklist display system of claim 1, wherein the at least one normal checklist identifier is aircraft flight phase dependent.

5. The checklist display system of claim 1, wherein the limitation information is displayed so as to be visually associated with its relating non-normal checklist identifier.

* * * * *